(12) United States Patent
Alvin

(10) Patent No.: US 6,863,868 B1
(45) Date of Patent: Mar. 8, 2005

(54) CATALYTICALLY ENHANCED FILTRATION APPARATUS

(75) Inventor: Mary Anne Alvin, Pittsburgh, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 839 days.

(21) Appl. No.: 09/676,181

(22) Filed: Sep. 29, 2000

(51) Int. Cl.$^7$ .............................................. B01D 50/00
(52) U.S. Cl. ...................................... 422/168; 422/177
(58) Field of Search ................................ 422/168, 169, 422/171, 177, 180, 211, 222, 178

(56) References Cited

U.S. PATENT DOCUMENTS

| | | | | |
|---|---|---|---|---|
| 5,453,108 A | * | 9/1995 | Isaksson et al. | 55/302 |
| 5,460,637 A | * | 10/1995 | Connolly et al. | 55/487 |
| 5,944,859 A | * | 8/1999 | Lippert et al. | 55/302 |
| 6,110,860 A | * | 8/2000 | Inoue et al. | 502/218 |
| 6,273,925 B1 | * | 8/2001 | Alvin et al. | 55/282.2 |

* cited by examiner

Primary Examiner—Samuel M. Heinrich (57) ABSTRACT

A hot gas filtration apparatus includes a vessel, a plurality of filter elements mounted within the vessel and positioned such that hot gas flows through said filter elements, with each of said filter elements having a porous body, and a catalytic layer on surfaces of the porous body. The porous body of the filter element may include one of: a porous ceramic monolithic matrix, a continuous fiber reinforced ceramic composite (CFCC) matrix, a metallic matrix, an intermetallic matrix, a superalloy, and a metal-ceramic composite matrix. When the porous body is a nonoxide ceramic, a metallic matrix, an intermetallic matrix, a superalloy, or a metal-ceramic composite matrix, the invention further includes an oxidative resistant layer coating surfaces within the porous body, and the catalytic layer is on the oxidative resistant layer. A porous particulate removal membrane can be positioned on one or more surfaces of the filter element. The porous membrane can also provide a surface for one or more catalysts. The catalysts on the porous surface of the membrane(s) can be the same as or different from the catalysts on surfaces within the porous body.

10 Claims, 5 Drawing Sheets

CATALYTICALLY ENHANCED FILTRATION APPARATUS

BACKGROUND OF THE INVENTION

This invention relates to filters, and more particularly to filter elements that are useful in hot gas filter assemblies.

Many processes exist wherein a hot gaseous medium is produced which contains particulate material that must be separated from a gaseous medium, either to prevent pollution, or to remove hazardous material. High temperature filtration of particulates has become an important component in many emerging technologies. Advanced coal conversion technologies, such as fluid bed gasification and combustion, are dependent upon the successful removal of particulates at temperatures in the range of about 500° C. to 1000° C. Other applications which benefit from high temperature filtration range from gas cleaning for biomass gasification to power generation from the incineration of municipal solid wastes. These applications require the removal of particulates from gas streams at high temperature so that process equipment, such as rotating machinery and heat exchangers, which are subjected to the gas streams, remain functional and efficient.

Examples of hot gas filter assemblies are shown in U.S. Pat. Nos. 5,944,859; 5,876,471; 5,453,108; 5,433,771; 4,904,287; and 4,737,176. Hot gas filtration systems used in electric power generating systems protect downstream heat exchangers and gas turbine components from particle fouling and erosion, and clean the process gas to meet emission requirements. When installed in either pressurized fluidized-bed combustion (PFBC), pressurized circulating fluidized-bed combustion (PCFBC), or integrated gasification combined cycle (IGCC) power plants, lower downstream component costs are projected, in addition to improved energy efficiency, lower maintenance, and elimination of additional and expensive fuel or flue gas treatment systems.

The principal function of the hot gas filter elements that are used in either coal-fired or industrial applications has typically been the removal of fine particulates. During gasification, fuel-bound nitrogen in coal is principally released as ammonia ($NH_3$) into the fuel gas stream. With subsequent combustion of the fuel gas in a gas turbine, $NH_3$ forms oxides of nitrogen ($NO_x$), which are difficult to remove hazardous pollutants, and precursors to "acid rain". The concentration of ammonia in fuel gas can vary from 200 to 5,000 ppmv depending on the nitrogen content of the feedstock coal, as well as the configuration of the gasifier and its operation. The ammonia concentration in the fuel gas depends on the time-dependent history of the gas in the gasifier, with longer residence time at high temperature (>1000° C.) favoring removal of ammonia via thermal decomposition ($NH_3 \rightarrow \frac{1}{2}N_2 + 3/2\ H_2$). The concentration of ammonia is not further reduced after leaving the gasifier due to lowered temperature and shorter residence time in downstream process piping.

Nickel and $MoS_2$-based catalysts have been shown to be capable of decomposing ammonia in hot coal-derived gas streams. In the absence of $H_2S$, decomposition of ammonia can be carried out readily at 550–800° C. using nickel-based catalysts. The ammonia decomposition capability and performance of several catalysts containing Ni, Co, Mo, and W (with $Al_2O_3$ and $TiO_2$) has been evaluated in simulated coal-derived gas streams.

Alternative approaches for removal of ammonia have also been described, including: (1) decomposition on the surface of Alloy RA339 in the temperature range of 1200–1300° F. and 1500–1600° F.; (2) decomposition on the surface of an aluminosilicate catalyst in the temperature range of 800–1000° F.; and (3) the use of the RA-330 Promoted Decomposition (RAPD) process whereby fuel gas enters an ammonia decomposition reactor that contains a packed bed of RA330 honeycombs at temperatures of 1500–1600° F. Ammonia decomposition to $N_2$ and $H_2$ on the surface of RA-330, has also been proposed.

In addition to the production of unwanted gasses, aerosol tars that are formed during coal gasification are not readily removed from gas streams by conventional means, and thus often end up plugging filters or fouling fuel cells, turbines, or sorbents. Catalytic cracking of tars to molecular species containing <10% carbon atoms would prevent the problem commonly attributed to the tars. Several approaches to catalytically cracking tars have been proposed, including: the use of dolomites and Englehard extruded and finely divided zeolites, and the use of nickel-based catalysts for hot gas cleaning when the flue gas contains a low tar content.

Nickel-based catalysts have been used to promote reforming and upgrading of the process gas stream generated during biomass gasification. In such systems, ceramic filter elements were used to remove particulates from the 500–600° F. biomass gasification stream.

The process gas then entered a calcined bed of dolomite, where ultimately 90–95 wt % of the tars present in the flue gas were removed, primarily through the reaction of coke+ $H_2O \rightarrow CO + H_2$. As a result, $H_2$ content increased as flue gas passed through the catalytic bed; CO increased in the catalytic reactor; $CO_2$ decreased in the flue gas after going through the catalytic bed; steam content decreased after going through the catalytic bed; and methane decreased in the catalytic bed as a result of steam and dry ($CO_2$) reforming reactions.

Numerous patents relate to the use of catalysts for removal of process gas contaminants primarily through the use fuel-based additives, and catalyst-based reactors. For example, the following United States Patents relate to the reduction of $NO_x$ compounds: U.S. Pat. Nos. 5,283,055; 3,885,020; 4,080,433; 4,049,583; 4,001,143; 3,900,428; 3,963,827; 3,895,093; 4,140,655; and 5,552,129. The following United States Patents relate to ammonia reduction: U.S. Pat. Nos. 4,389,339; 3,931,051; 4,812,300; and 4,018,712. The following United States Patents relate to partial oxidation of methane: U.S. Pat. Nos. 4,140,655; 3,895,093; and 5,149,516. The following United States Patents relate to steam reforming and/or hydrocarbon treatment: U.S. Pat. Nos. 4,456,703; 4,179,409; 4,055,513; 4,102,777; 3,885,020; 4,080,433; and 4,049,583. The following United States Patent relates to $SO_x$ reduction: U.S. Pat. No. 4,589,978.

It would be desirable to have a filter element that not only removes particulates, but also removes various pollutants and undesirable components of the gas.

SUMMARY OF THE INVENTION

A hot gas filtration apparatus constructed in accordance with this invention includes a vessel, a plurality of filter elements mounted within the vessel and positioned such that hot gas flows through said filter elements, with each of said filter elements having a porous body, and a catalytic layer on surfaces of the porous body. The porous body of the filter element may include one of: a porous ceramic monolithic matrix, a continuous fiber reinforced ceramic composite (CFCC) matrix, a metallic matrix, an intermetallic matrix, a superalloy, and a metal-ceramic composite matrix. When the porous body is a nonoxide ceramic, a metallic matrix, an intermetallic matrix, a superalloy, or a metal-ceramic composite matrix, the invention further includes an oxidative resistant layer coating surfaces within the porous body, and the catalytic layer is on the oxidative resistant layer. A porous particulate removal membrane can be positioned on one or more surfaces of the filter element. The porous membrane can also provide a surface for one or more catalysts. The catalysts on the porous surface of the membrane(s) can be the same as or different from the catalysts on surfaces within the porous body.

DESCRIPTION OF THE PREFERRED EMBODIMENTS

Figure 1:
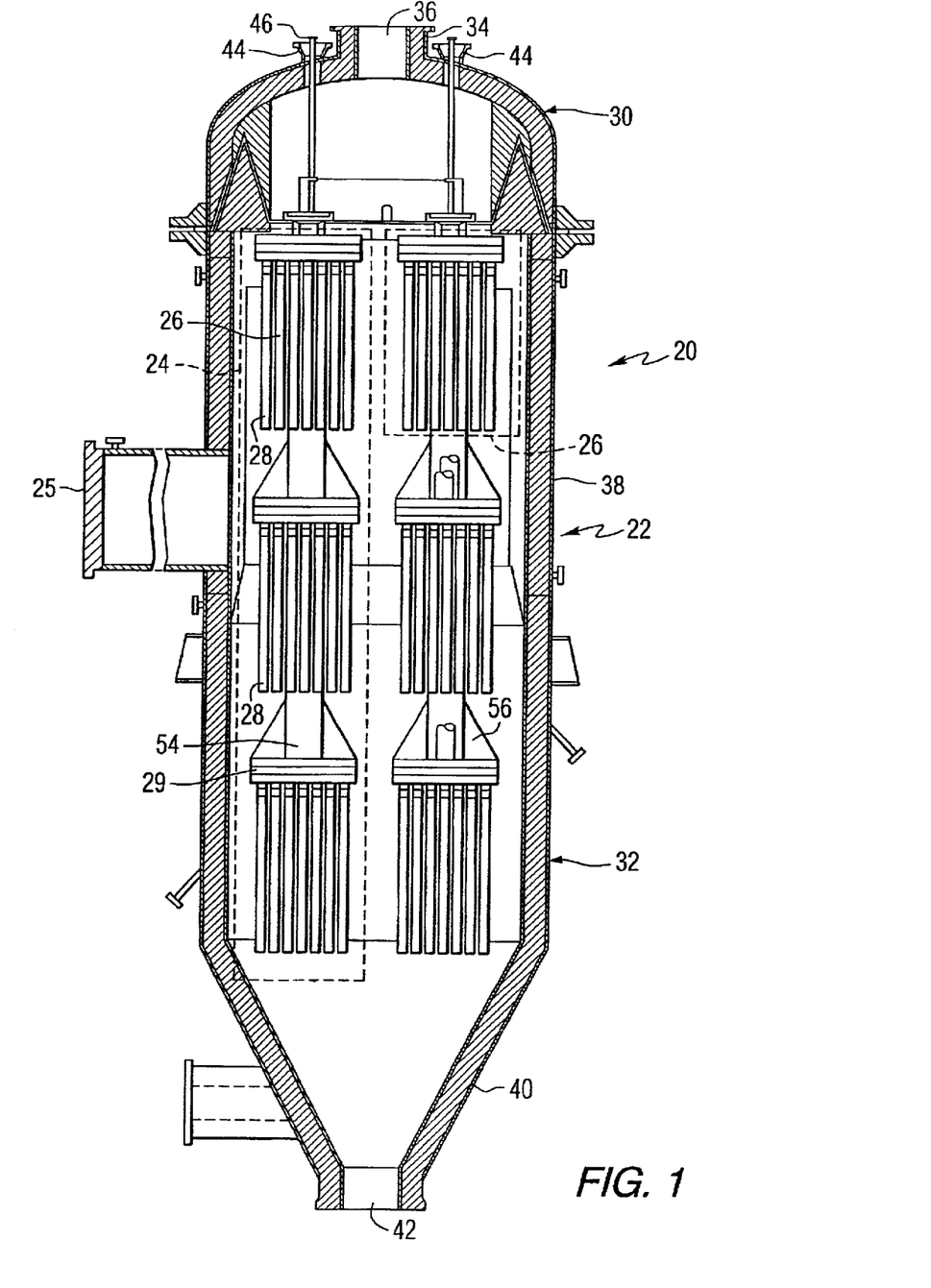
FIG. 1 is a longitudinal section view of a pressure vessel incorporating the filter elements of the present invention.

The preferred embodiment of this invention incorporates catalytically enhanced filter elements into a filter assembly similar to that disclosed in U.S. Pat. No. 5,876,471. Referring to the drawings, FIG. 1 shows a filter apparatus 20 for separating particulate matter from a gas stream that includes filter elements constructed in accordance with this invention. This apparatus includes a pressure vessel 22 in which there are mounted a plurality of clusters 24 comprising a plurality of filter element arrays 26. Each of these filter element arrays 26 includes a plurality of candle filter elements 28.

The pressure vessel 22 has a dome-shaped head 30 and body 32. The dome-shaped head 30 terminates in a linear tip 34, defining an exit opening or nozzle 36 for the filtered gas to be removed from the vessel 22. The body 32 includes a dirty gas inlet 25, an upper part 38 having a generally circular cylindrical shape joined by a frusto-conical ash hopper 40 for receiving the particulate matter terminating in a linear tip defining an opening or nozzle 42 for connection to an ash discharge line. A plurality of ports 44 extend from the dome-shaped head 30. The ports 44 provide a site for inserting instrumentation and for viewing the interior of the dome-shaped head 30 during shutdown periods. Tubes for supplying a back pulse burst of gas for cleaning the candle filters 28 can be inserted through the ports 44.

Figure 2:
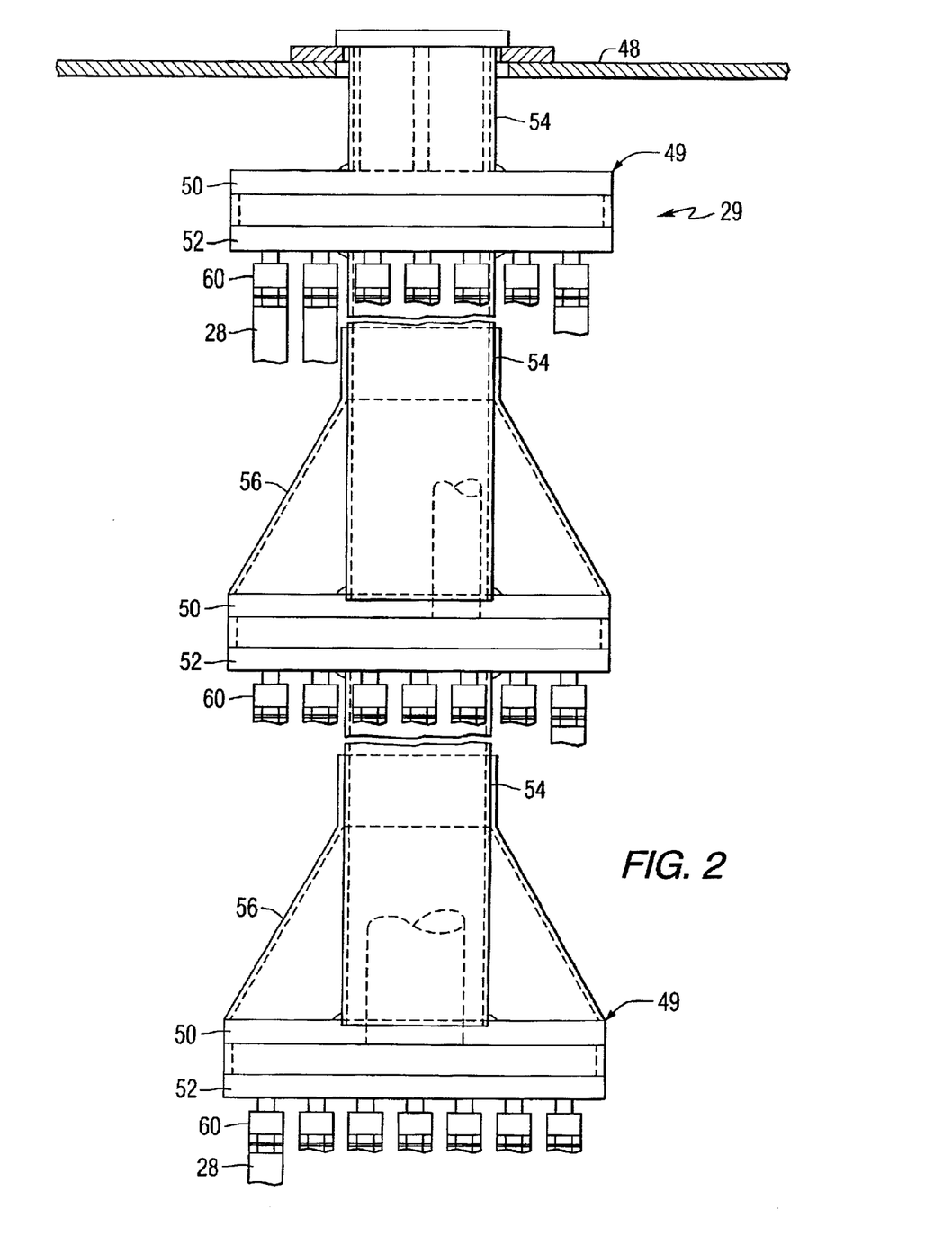
FIG. 2 is a side elevation view of an array of filter elements coupled to a tube sheet.

The pressure vessel includes a tubesheet 48 as shown in FIG. 2 which separates the dirty and clean sides of the system, and which supports vertical clusters 24 of filter element arrays. Each cluster 24 is comprised of one or more manifolds (plenums) 29 which in turn support arrays 26 containing filter elements 28. Each plenum 29 comprises an upper plate 50 and a lower plate 52. In accordance with the present invention, each filter element 28 is held within a filter holder and gasket assembly 60 and coupled to the corresponding lower plate 52 of the plenum 29. Each cluster support pipe 54 is secured within the pressure vessel 22. A dust shed or particle-deflector 56 having a generally frusto-conical shape is attached above each plenum 29.

Figure 3:
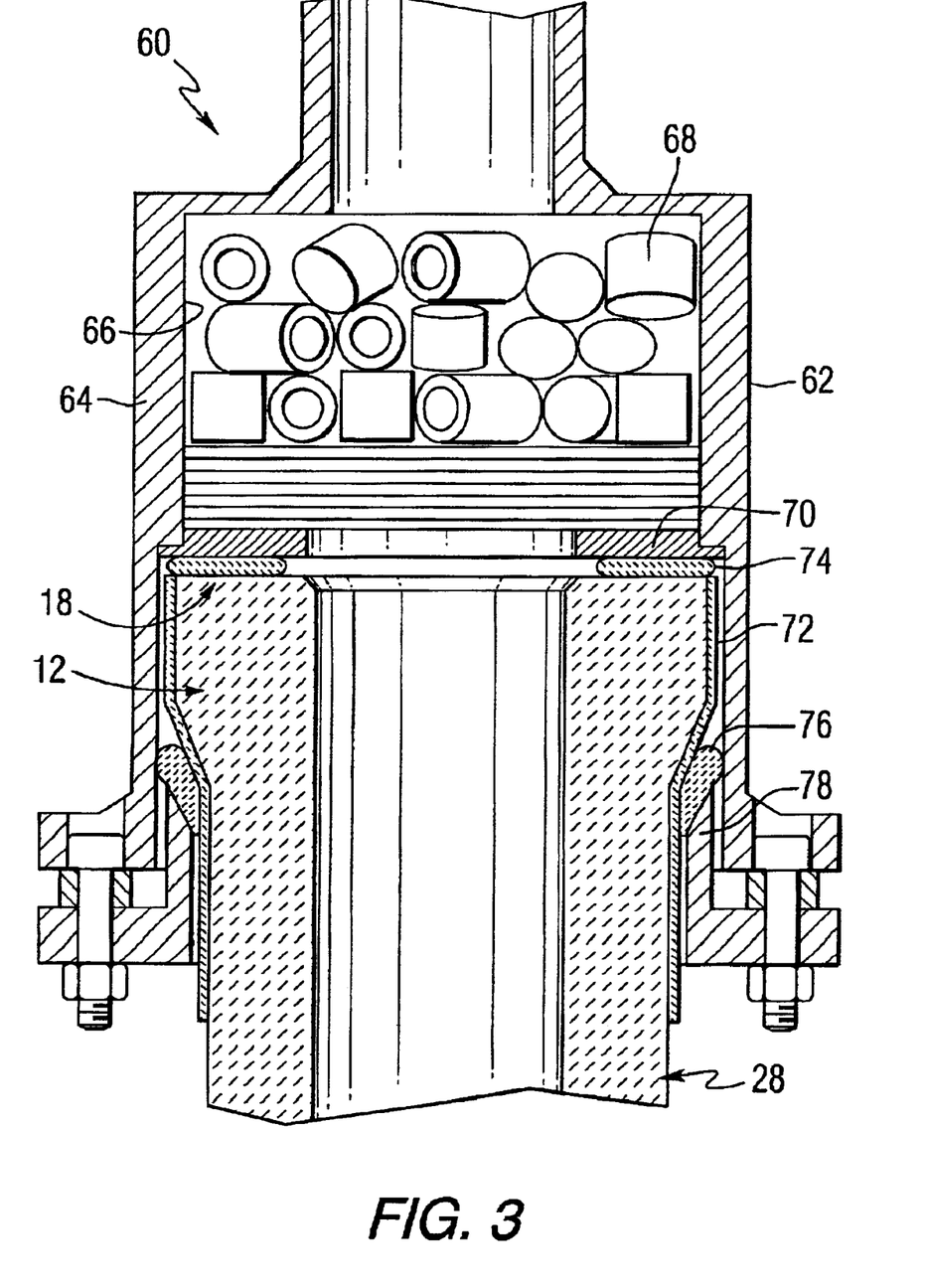
FIG. 3 is a sectional view of a filter holder and gasket assembly illustrating a typical mounting assembly used with thick walled hollow candle filter embodiments of the present invention.

FIG. 3 is a sectional view of a filter holder and gasket assembly 60 with a thick-wall hollow tube monolithic ceramic and/or porous metal candle filter 28. The filter element can include porous oxide-based and non-oxide-based ceramic matrices, as well as porous metal and intermetallic media. Referring to FIG. 3, the filter holder and gasket assembly 60 provides a particulate barrier seal between the clean gas and dirty gas surfaces of the filter element 28. In FIG. 3, the filter holder and gasket assembly 60 is shown assembled. The filter holder and gasket assembly 60 comprises a filter housing 62 having a peripheral sidewall 64 which defines an interior chamber 66, a fail-safe/regenerator device 68, permanently or removably installed within the interior chamber 66, an annular spacer ring 70 permanently or removably installed within the interior chamber 66, a gasket sock or sleeve 72, a top or topmost compliant gasket 74, a bottom or bottommost compliant gasket 76, and a cast nut 78.

Preferably the spacer ring 70 is permanently mounted to the fail-safe/regenerator to produce a single unit that is placed within the interior chamber 66 of the filter housing. In this case, the spacer ring 70 may be welded in abutment with the fail-safe/regenerator 68 to secure the fail-safe/regenerator 68 unit and to prevent the filter element 28 from moving and contacting the filter housing 62 thereby preventing possible damage to the filter element 28. When the fail-safe/regenerator device 68 is not incorporated into filter housing 62, then only the spacer ring 70 will be securely mounted within the filter holder interior chamber 66. Alternatively the fail-safe/regenerator device 68 may be removably mounted within the housing interior chamber 66 with the spacer ring 70 permanently mounted within the housing interior chamber 66. The fail-safe/regenerator device 68 is provided to prevent particulate matter from traveling from the dirty gas stream to the clean gas area of the pressure vessel if a filter element fails, is damaged or breaks. Additionally, during filter cleaning, the fail-safe/regenerator 68 will heat the back pulse gas that is generally cooler than the gas stream to prevent the filter element 28 from enduring thermal fatigue or cracking.

Figure 4:
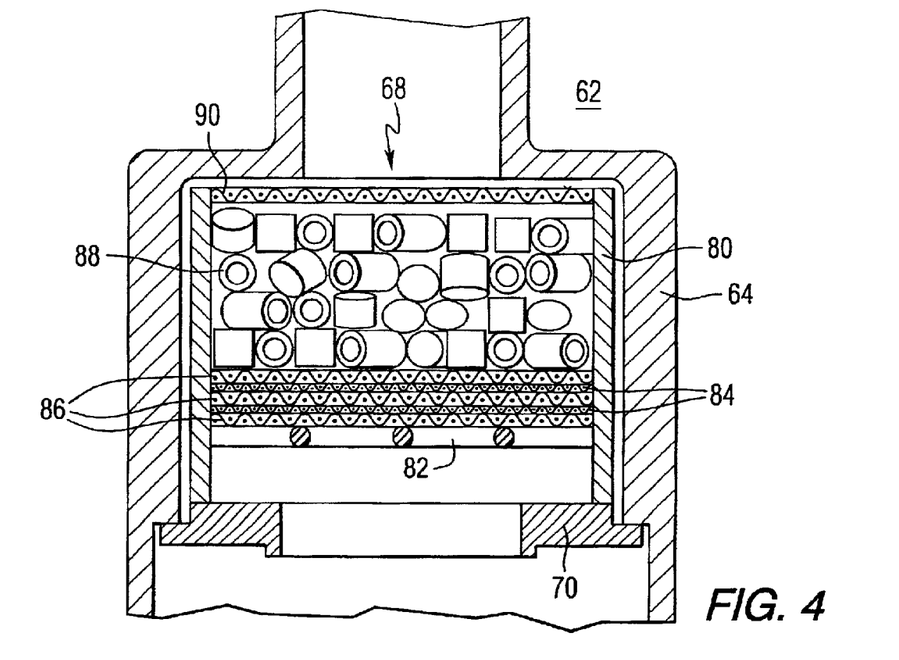
FIG. 4 is a sectional view of a fail safe regenerator unit used in combination with the filter elements of the present invention.

The fail-safe/regenerator unit 68 is similar to that disclosed in U.S. Pat. No. 5,433,771. As shown in FIG. 4, the unit includes of a cylindrical pipe or tube 80. A perforated metal plate 82 is welded to within the cylindrical pipe or tube 80. Fine mesh screens 84, and heavy mesh support wires 86 are positioned adjacent to the perforated metal plate 82 within the interior of the cylindrical pipe or tube 80. The fine mesh screens 84 serve as the fail-safe mechanism to capture and retain fines, and plug in the event that a candle filter 28 fails, is damaged or breaks. The heavy mesh support wires 86 provide structure to support the fine mesh screens 84. Within the interior of the fail-safe/regenerator 68, raschig rings 88 are contained between the heavy mesh support wires 86 and 90, to heat incoming pulse gas that is used to clean the candle filters 28, filter arrays 26, within the pressure vessel 20.

The filter housing 62, annular spacer ring 70, and fail-safe/regenerator device 68 are made of a material that can withstand the relatively high temperatures that are reached during operation and possess the strength and durability to support the filtering components, preferably a high temperature metal material, such as 310S stainless steel.

The thick walled monolithic candle filter body 28 typically has an outer diameter of approximately 60 mm and an inside diameter that ranges from about 30 mm to about 45 mm. The thick walled candle filter 28 is typically fabricated from porous monolithic oxide or nonoxide based ceramics, and/or porous metal or intermetallic media with a dense metal flange. The porous monolithic oxide materials include, but are not limited to alumina, aluminosilicate, mullite, mullite bonded alumina, cordierite, and the like. The porous monolithic nonoxide-based materials include, but are not limited to silicon carbide, clay bonded silicon carbide, reaction bonded silicon nitride, sinter bonded silicon nitride, recrystallized silicon carbide, chemical vapor infiltrated/ deposited (CVI/CVD) silicon carbide, and the like. Manufacturing of said materials includes, but is not limited to sinter bonding of adjacent grains at high temperature with or without bonding aids, pore formers, etc., forming a porous wall with uniform wall thickness of the material, or a graded wall of the material with either an outer and/or an inner denser layer of the material or an alternative material which forms a surface membrane. Alternative manufacturing processes utilize both oxide-based and non-oxide-based ceramic matrices to form porous reticulated foams. The porous foam similarly may take the form of a uniform wall thickness of the material, or may be a graded wall of the material with either an outer and/or inner denser layer of the material or alternate material which forms a surface particulate barrier membrane. The porous metal and/or intermetallic media may include, but not be limited to 310S stainless steel, Hastelloy X, Inconel 600, iron aluminide, FeCrAlY (iron, chromium, aluminum, and yttrium-based alloy), and alternate superalloys, such as HR230, HR556, HR214, HR188, HR160, RA333, RA85H and the like. The porous metal and/or intermetallic media is generally welded to a dense metal flange typically manufactured from 310S stainless steel, in order to provide structural strength for the flange to accept a load and for adequate sealing of the unit within the pressure vessel 20.

Referring again to FIG. 3, the gaskets 72, 74, and 76 are individual components that are separate and apart from the filter housing 62. The gasket sock 72 or sleeve is preferably made from high temperature ceramic fibers that are woven or braided into a circular sleeve. The shape and size of gaskets 72, 74, 76 must be large enough to be positioned on or around the candle filter to provide an adequate particulate barrier seal to prevent penetration of particulates from the dirty process gas stream into the clean gas stream.

Large inner diameter (i.d.) continuous fiber ceramic composites (CFCC) or filament wound candle filters can be utilized within the filter apparatus 20. These include, but are not limited to oxide-based fibers or oxide-based CFCC filter matrix manufactured by McDermott Technology, Inc., oxide-based fibers or oxide-based sol-gel CFCC filter matrix manufactured by Albany International Techniweave, Inc., and polycrystalline filament wound alumina/mullite/ cordierite matrix manufactured by AlliedSignal (currently Honeywell, and formerly DuPont Lanxide, Inc.) under the Tradename of PRD-66. Alternative materials for construction of the larger inner diameter candle filter include, but are not limited to oxide-based fibers (for example Nextel™ 312, Nextel™ 550, Nextel™ 610, Nextel™ 720 fibers manufactured by 3M, or Altex fibers manufactured by Sumitomo Chemical, etc.) encapsulated by CVI silicon carbide as manufactured by Americon, and the like, or non-oxide-based fibers encapsulated by CVI silicon carbide as manufactured by Textron, DuPont, and the like.

U.S. Pat. No. 5,876,471 discloses the use of an extended insert within thin wall composite ceramic and/or metal filters. Materials for construction of the thin wall composite ceramic candle filter 28 include, but are not limited to oxide-based fibers (for example Nextel™ 312, Nextel™ 550, Nextel™ 610, Nextel™ 720 fibers manufactured by 3M), encapsulated by CVI silicon carbide, or infiltrated with an oxide-based matrix by a sol-gel or alternate process, as manufactured by 3M.

Figure 5:
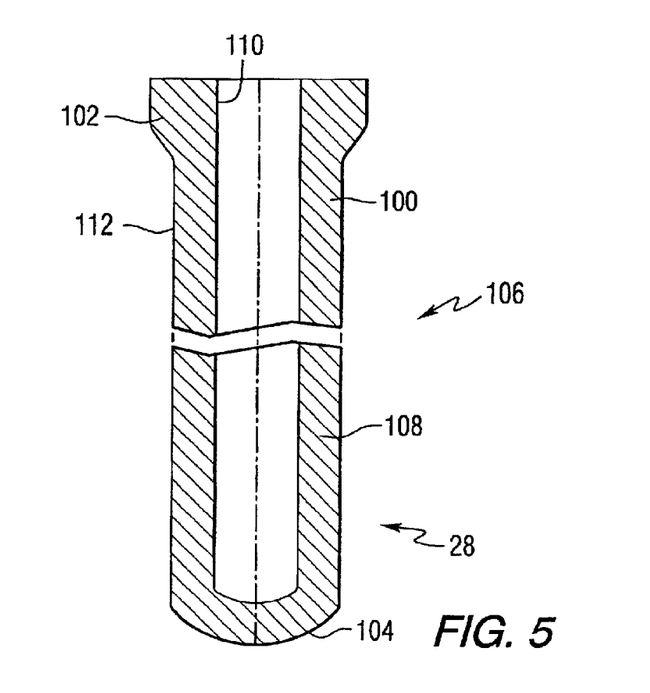
FIG. 5 is longitudinal section view of a thick walled candle filter element constructed in accordance with the present invention.

In the manufacture of the commercial, prototype, or developmental porous ceramic monoliths, continuous fiber reinforced ceramic composites, metallic, intermetallic, or metal-ceramic composite candle filters, a structural support body is generally initially formed. FIG. 5 is a longitudinal cross-sectional view of a thick walled candle filter element 28 constructed in accordance with the present invention. The structural support body includes a cylindrical tube 100, or tube-like configuration, and an integral flange 102 and end cap 104. Alternatively, the flange 102 and/or end cap 104 may be incorporated into a metal filter body during later stages of fabrication of the filter element, for example, by welding of densified metal flanges and/or end caps to porous metallic, intermetallic, metal-ceramic composite tubes; or by addition of a reticulated foam flange and/or end cap to CVI-SiC reticulated foam ceramic tubes; and the like.

When used in high temperature (i.e., >750–850° C.) pressurized circulating fluidized-bed combustion (PCFBC) or pressurized fluidized-bed combustion (PFBC) applications, nonoxide-based ceramics, metallic and intermetallic media, and metal-ceramic composite filter materials are recommended to be pretreated so as to afford oxidative stability and/or corrosion resistance to the filter body 106. For example, the structural support filter wall 108 can be initially prepared, via: (1) the application of thin oxide or mixed oxide coating(s) along the surface of porous CVI-SiC reticulated foam; (2) use of mullite CVI/CVD (chemical vapor infiltration/chemical vapor deposition) techniques, depositing an adherent layer of mullite along the surface of monolithic and composite SiC and $Si_3N_4$-based filter materials; (3) immersion and vacuum infiltration of ultra lowthermal expansion NZP ceramic materials ($NaZr_2P_3O_{12}$ and isostructural analogs as $CaZr_4P_6O_{24}$) throughout the porous filter wall of the nonoxide-based filter materials; and (4) pretreatment of the metal or intermetallic media at high temperature to form protective surface oxide coatings containing chromia and/or alumina, and the like.

The oxidation resistant layer protects the non-oxide ceramic matrices (i.e., SiC and $Si_3N_4$) and/or metal/ intermetallic/superalloy filter substrates from continued oxidation during operation in high temperature pressurized fluidized-bed combustion (PFBC) and pressurized circulating fluidized-bed combustion (PCFBC) systems. If an oxidation resistant coating is not applied to these substrates, silica ($SiO_2$) can form along the outer surface of the nonoxide-based ceramics, and metal/mixed metal oxides can form along the surface of metals and superalloys. During thermal cycling of the filter element (i.e., pulse cycling), spalling and/or flaking of the silica or metal/mixed metal oxide outer surface layer/scale can result, leading to removal of material, thinning of the matrix grains, fibers, etc., reducing the strength of the filter matrix and subsequently limit component integrity/life. With the addition of the protective oxide layer, surface layer oxidation along the internal grains and/or fibers contained within the filter matrix/media is limited, filter element life is increased (thus reducing the cost of operation through reduced change-out, cost of replacement materials, and maintenance efforts).

Porous particulate removal membranes 110 and 112 can be applied to the inside and outside of the candle filter element. If a nonoxide-based ceramic matrix, metallic and/or intermetallic media, and/or metal-ceramic composite membrane is applied during a later stage of manufacturing, the membrane should similarly be prepared to afford the oxidation and/or corrosion resistance characteristics imparted by the porous structural support filter wall. If a porous nonoxide-based ceramic matrix, metallic and/or intermetallic media, and/or metal-ceramic composite flange and/or end cap is assembled to the structural support filter body during another stage of manufacturing, the components should be prepared to afford oxidation and/or corrosion resistance characteristics.

The membranes can support layers of one or more catalysts, which may be the same as or different from the catalyst(s) in the body of the filter. The use of multi-catalysts in the filter media provides the potential for conversion of several reactions within a single substrate. Ultimately this reduces costs, since the reactions would be contained in a single vessel, versus multiple vessels that individually serve to process single reactions. For example, catalyst A can be applied to the structural support filter wall 108, while catalysts B can be applied to the outer and/or inner membrane(s). Alternatively, catalyst A and B can be added simultaneously to the structural support filter wall, with any combination thereof within the outer and/or inner membrane (s). Thus, catalyst A could promote reaction X and/or reaction Y, while if catalyst B were included within the filter media, reaction Z could also be catalytically enhanced, all within the same filter element, and within the same filter vessel (see above). Thus instead of accomplishing only reaction X, or reaction Y. or reaction Z, reactions X-Z or Y-Z, or X-Y-Z can occur. A catalyst can provide multiple functionality, that is, it can promote two or more reactions simultaneously. Alternatively, a combination of catalysts can be used to achieve multiple functionality. Various combinations of catalysts can be applied to surfaces within both the structural support filter wall and the inner and/or outer membranes.

Figure 6:
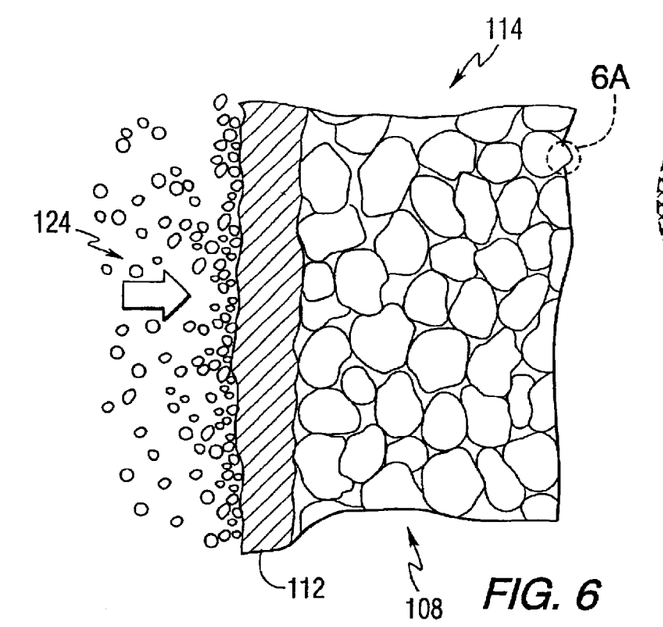
FIG. 6 is an enlarged schematic representation of a portion of the candle filter element of FIG. 5.
Figure 6A:
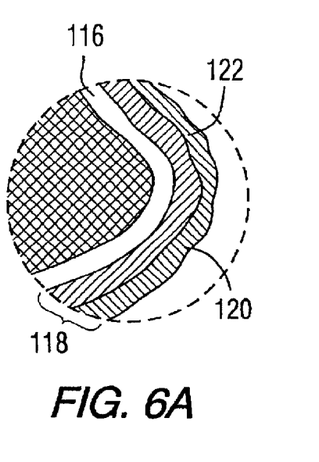
FIG. 6a is an enlarged detail of a portion of the candle filter element of FIG. 6.

FIG. 6 is an enlarged schematic representation of a portion of the candle filter element of FIG. 5, and FIG. 6a is a detail view of a portion of the filter element of FIG. 6. The porous support wall 108 is shown to be comprised of ceramic matrix or metal media 114. An oxidation resistant layer 116 is applied to the ceramic matrix or metal media 114. One or more layers 118 of catalytic material are applied to the porous structural support filter wall 108, via wash coating, vacuum infiltration, sol-gel, and the like. The layer or layers 118 coat the surface of the internal pore cavities and/or ligaments within the structural support wall of the filter body 108. The composition of the applied layer or layers may include, but not be limited to perovskite, zeolite, spinel structures 120, as well as metal or metal oxides, or mixed metals or mixed metal oxides 122. For example, for use in gasification applications where the application is directed to reduction of ammonia, layer 120 can comprise a perovskite mixed catalyst of the composition $ABO_3$ applied throughout the porous structural support wall. The composition includes A being an alkali, alkaline earth, rare earth, lanthanide; and B being from Group IB, IVB, VB, VIB, VIIB, VIII elements; where A is preferably lanthanum, strontium, or a mixture thereof, and B is preferably cobalt, nickel, copper, manganese. Alternately for the decomposition of $NO_x$ in combustion systems, a perovskite structure may be used $[(A^1_{1+x}A^2_x)B^1_{1-y} Me_y)O_3]$, wherein $A^1$ and $A^2$ are metals, $B^1$ is a metal, and Me is selected from the platinum group (Ru, Os, Rh, Ir, Pd, Pt); or a composition of the form $(A_1)_m(A_2)_n(B_1)_p (B_2)_q O_3$ may be used, wherein $A_1$ included Bi, the rare earth group elements, $A_2$ is Sr, Ba, Pb, B1 is Ni, Co, Fe, Zn, Cu, Mn, B2 is Ru, Os, Ir, Pt, Ti, Mo. W, Nb, Mn, V (Ta, Sb, Nb). The embodiments using zeolites can include $(Na_2, K_2, Ca, Ba)[(Al, Si) O_2)_{n \cdot x} H_2 O)$. The spinels can include $(Mg, Fe, Zn, Mn)(Al) O_x$, etc. The single or mixed oxides can include alumina or aluminosilicates (alumina with Group 3b additives).

In order to provide barrier or bulk filtration characteristics to the filter element in conventional hot gas filtration systems, the surface of the filter body that is directly contacted with the particulate-laden process gas may include the application of a surface membrane 112 to prevent passage of fines contained in the process gas stream 124 through the filter element to the clean particulate-free gas stream that exists through the internal bore of the candle filter. A surface membrane is typically required if the structural support filter wall contains pores that are >20–50 μm and a tortuous interconnecting porous structure is not present (i.e., direct through holes).

The porous particulate removal surface membrane 112 is typically ~50–200 μm thick, and comprises material of composition similar to that of the underlying structural support wall. For example: fine ~1–10 μm SiC grains bonded to the ~100–500 μm SiC grains in the Pall Advanced Separation clay bonded silicon carbide candle filters; slurry deposited alumina (minor concentrations of aluminosilicate present) forming a surface membrane along the chevron pattern filament wound structural support matrix of the alumina/mullite/cordierite-containing Allied Signal PRD-66 filter matrix; or sol-gel infiltration of alumina (minor concentrations of aluminosilicate present) forming a surface membrane along and slurry infiltration into the Nextel™ 610 or 720 woven or filament wound structural support wall of the Albany Techniweave or McDermott CFCC filter elements, and the like.

Alternatively, the membranes can include a mixed oxide fiber/nonoxide grain composition (i.e., ~1–10 μm SiC grains/aluminosilicate fibers bonded to the ~100–500 μm SiC grains in the Schumacher Dia Schumalith clay bonded silicon carbide candle filters), or a mixed oxide membrane/nonoxide structural support wall (i.e., fine grained alumina-containing membrane along a structural support CVI-SiC reticulated foam Ultramet filter wall).

Figure 7:
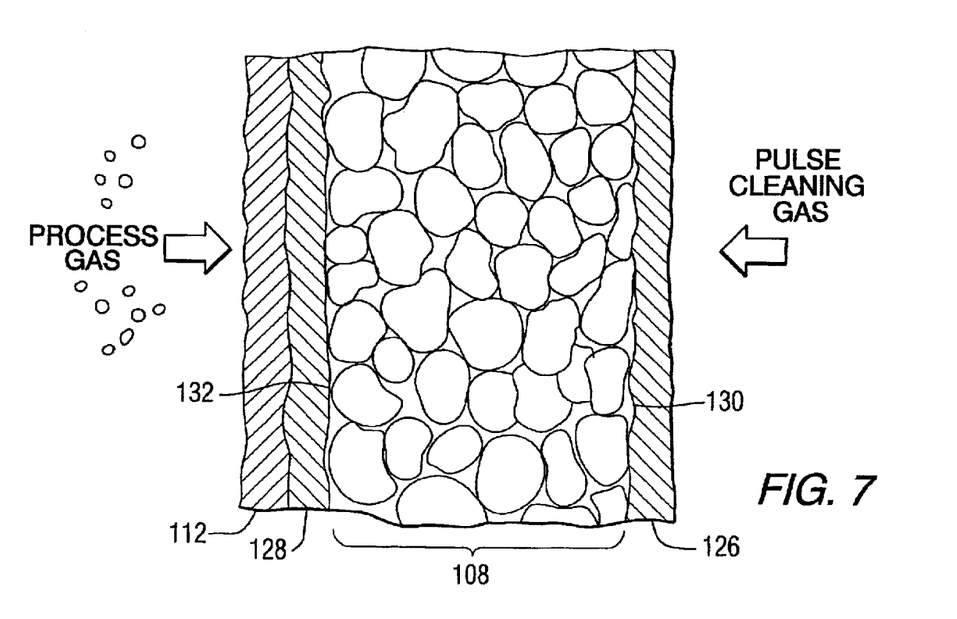
FIG. 7 is an enlarged schematic sectional view of a portion of the wall of the candle filter element of FIG. 5.

As shown in FIG. 7, one or more additional porous membranes 126 and 128 can be applied to the filter body to further assist in the catalytic processing of specific gas contaminants. For example membrane 126 may be incorporated along the non-process gas contacting surface 128 of the filter body (i.e., pulse cycled surface). Thus the filter element would have two discrete functional membranes, one for particulate removal along the process gas contacting surface of the filter element, and a second for additional catalytic gas processing along the pulse cycle surface of the filter element.

A catalytically enhanced membrane 128 can also be placed beneath the particulate removal membrane 112 and on the underlying structural support filter wall 132 of the filter body. Catalytically enhanced membranes containing single or mixed oxides, perovskite, zeolite, spinel structures, and the like, as well as metal or metal oxides, or mixed metals or mixed metal oxides, are preferably added as a single discrete layer 126 or 128 via slurry or spray deposition, isostatic pressing, and so on. Alternately the catalytically enhanced membranes may be applied as a mixed layer contained within the particulate barrier membrane 112. The composition of the applied internal pore cavity layer or coating, as well as membrane(s) may support fuel processing of a single process gas contaminant, or may support multiple or a compound sequence of reactions.

Throughout the various stages of manufacturing, drying and high firing of the components at temperatures specific to the component composition are undertaken to assure adherence of the catalytically enhanced coating(s) or layer(s), as well as membrane(s) to the structural support filter wall.

In order to achieve functional performance of the catalytically enhanced filter element, removal of sulfur containing species such as $H_2S$, known to poison catalysts, is accomplished by upstream polishing with sorbent materials as zinc titanate, dolomite, or limestone, and the like. Process gas conversion is accomplished via contact of the incoming particulate-free process gas with the catalytically enhanced matrix contained along the large pore cavities in the structural support wail 108, as well as along the surface of the smaller pores that are present within the membrane-coated (i.e., pulse cycled) surface 130. Should a catalytically enhanced membrane 128 be incorporated between the particulate removal membrane 112 and the underlying structural support filter wall 132, process gas conversion would be initiated prior to passage through the filter wall.

Porous monolithic ceramic, continuous fiber reinforced ceramic composite (CFCC), metallic, intermetallic, metallic/ceramic composite filters have been primarily used as barrier or bulk particulate filtration devices or components, for removing particulates released in coal-fired, biomass, and alternate industrial applications. This invention extends the functional nature of the filtration device (i.e., candles, tubes, cross flow, inverted candles, sheet, honeycomb, etc., configurations) to "process gas," through the incorporation of catalysts applied (i.e., wash coats of single or mixed oxides, perovskite, zeolites, etc.; application via sol-gel; etc.) directly on or within the filter body, thus providing the basis for generation of specific catalytically-active filter units for use in advanced coal-fired and biomass applications. Furthermore with the incorporation of a second functional membrane, improved conversion of process gas contaminants can be realized.

The catalytically enhanced filters of this invention provide both particulate removal and fuel processing capabilities within commercially available, prototype or developmental filters, thus capturing the dual functionality of the elements, and providing capabilities to specifically design the catalytically enhanced layer and/or membrane to achieve desired fuel processing reactions (i.e., ammonia or $NO_x$ reduction, water gas shift reactions, tar cracking, partial oxidation of methane, and so on). This can reduce and/or eliminate the use of fuel additives injected into the process gas stream, or the inclusion of large, expensive, catalytic reactors to achieve fuel processing.

The advanced barrier filters of this invention can also be applied to industrial applications where enhanced purity of product, separation of materials, and emissions control can be realized. This invention provides added value to the use of porous ceramic monoliths or continuous fiber reinforced ceramic composite (CFCC), as well as porous metallic, intermetallic, and/or metallic/ceramic composite filter elements through the addition of catalytic materials along the porous structural support matrix and/or additional membranes.

Incorporation of the catalyst directly on or within the porous ceramic, continuous fiber reinforced ceramic composite (CFCC), metal, intermetallic, and/or metallic/ceramic composite filter body (i.e., wash coats of single or mixed oxides, perovskite, zeolites, spinels, etc.; application via sol-gel; etc.), provides the basis for generation of specific catalytically-active filter elements for use in advanced coal-fired and biomass applications. Furthermore with the incorporation of a second functional membrane, improved conversion of process gas contaminants can be realized.

While the present invention has been described in terms of what is at present believed to be its preferred embodiments, it will be understood by those skilled in the art that various changes may be made to the preferred embodiments without departing from the scope of the invention as defined by the following claims.

What is claimed is:

1. A hot gas filtration apparatus comprising:

a vessel;

a plurality of filter elements mounted within said vessel and positioned such that hot gas flows through said filter elements, each of said filter elements having a porous body, wherein the porous body includes an outer surface and an inner surface, said porous body forming a substantially closed figure having a closed end and an open end, said open end formed to be coupled to a support structure, said porous body defining a channel beginning at said open end and terminating at said closed end through which a filtered clean gas can flow into the clean gas side of a hot gas clean up system, said porous body defining a flange at said open end for attachment to said support structure;

a first catalytic layer on surfaces within the porous body; and a porous membrane positioned on said outer surface of said porous body; and said membrane including a second catalytic layer.

2. The hot gas filtration apparatus of claim 1, further comprising:

a porous membrane positioned on said inner surface of said porous body; and said membrane including a third catalytic layer.

3. The hot gas filtration apparatus of claim 2, wherein said second and third catalytic layers include different catalysts.

4. The hot gas filtration apparatus of claim 1, further comprising:

a porous membrane positioned on said inner surface of said porous body; and said membrane including a second catalytic layer.

5. A hot gas filtration apparatus comprising:

a vessel;

a plurality of filter elements mounted within said vessel and positioned such that hot gas flows through said filter elements, each of said filter elements having a porous body; and a catalytic layer on surfaces within the porous body, wherein the catalytic layer comprises:

a perovskite mixed catalyst of the composition $ABO_3$;

wherein A includes one of an alkali, alkaline earth, rare earth, and lanthanide elements; and wherein B includes an element from one of groups IB, IVB, VB, VIB, VIIB, and VIII.

6. The hot gas filtration apparatus of claim 5, wherein A includes one of lanthanum, strontium, and a mixture of lanthanum and strontium; and wherein B includes one of cobalt, nickel, copper, and manganese.

7. A hot gas filtration apparatus comprising:

a vessel;

a plurality of filter elements mounted within said vessel and positioned such that hot gas flows through said filter elements, each of said filter elements having a porous body; and a catalytic layer on surfaces within the porous body, wherein the catalytic layer comprises:

a perovskite structure of the form $[(A^1_{1+x}A^2_x)B^1_{1-y}Me_y)O_3]$;

wherein $A^1$, $A^2$, and $B^1$ each comprises a metal; and wherein Me includes one of Ru, Os, Rh, Ir, Pd, and Pt.

8. A hot gas filtration apparatus comprising:

a vessel;

a plurality of filter elements mounted within said vessel and positioned such that hot gas flows through said filter elements, each of said filter elements having a porous body; and a catalytic layer on surfaces within the porous body, wherein the catalytic layer comprises:

a perovskite structure of the form $(A_1)_m(A_2)_n(B_1)_p(B_2)_qO_3$;

wherein $A_1$ includes a rare earth element;

wherein $A_2$ includes one of Sr, Ba, and Pb;

wherein $B_1$ includes one of Ni, Co, Fe, Zn, Cu, and Mn; and wherein $B_2$ includes one of Ru, Os, Ir, Pt, Ti, Mo, W, Nb, Mn, Ta, and Sb.

9. A hot gas filtration apparatus comprising:

a vessel;

a plurality of filter elements mounted within said vessel and positioned such that hot gas flows through said filter elements, each of said filter elements having a porous body; and a catalytic layer on surfaces within the porous body, wherein the catalytic layer comprises:

a zeolite of the form $(A)[(B)O_2)_n xH_2O)]$;

wherein A includes one of $Na_2$, $K_2$, Ca, and Ba; and wherein B includes one of Al and Si.

10. A hot gas filtration apparatus comprising:

a vessel;

a plurality of filter elements mounted within said vessel and positioned such that hot gas flows through said filter elements, each of said filter elements having a porous body; and a catalytic layer on surfaces within the porous body, wherein the catalytic layer comprises a spinel of the form $(A)(Al)O_x$, and wherein A includes one of Mg, Fe, Zn, and Mn.

* * * * *